Nov. 26, 1940.  C. F. H. RUPP ET AL  2,223,009
INSTRUCTION DEVICE FOR MUSICAL INSTRUMENTS
Filed July 24, 1937    3 Sheets-Sheet 1
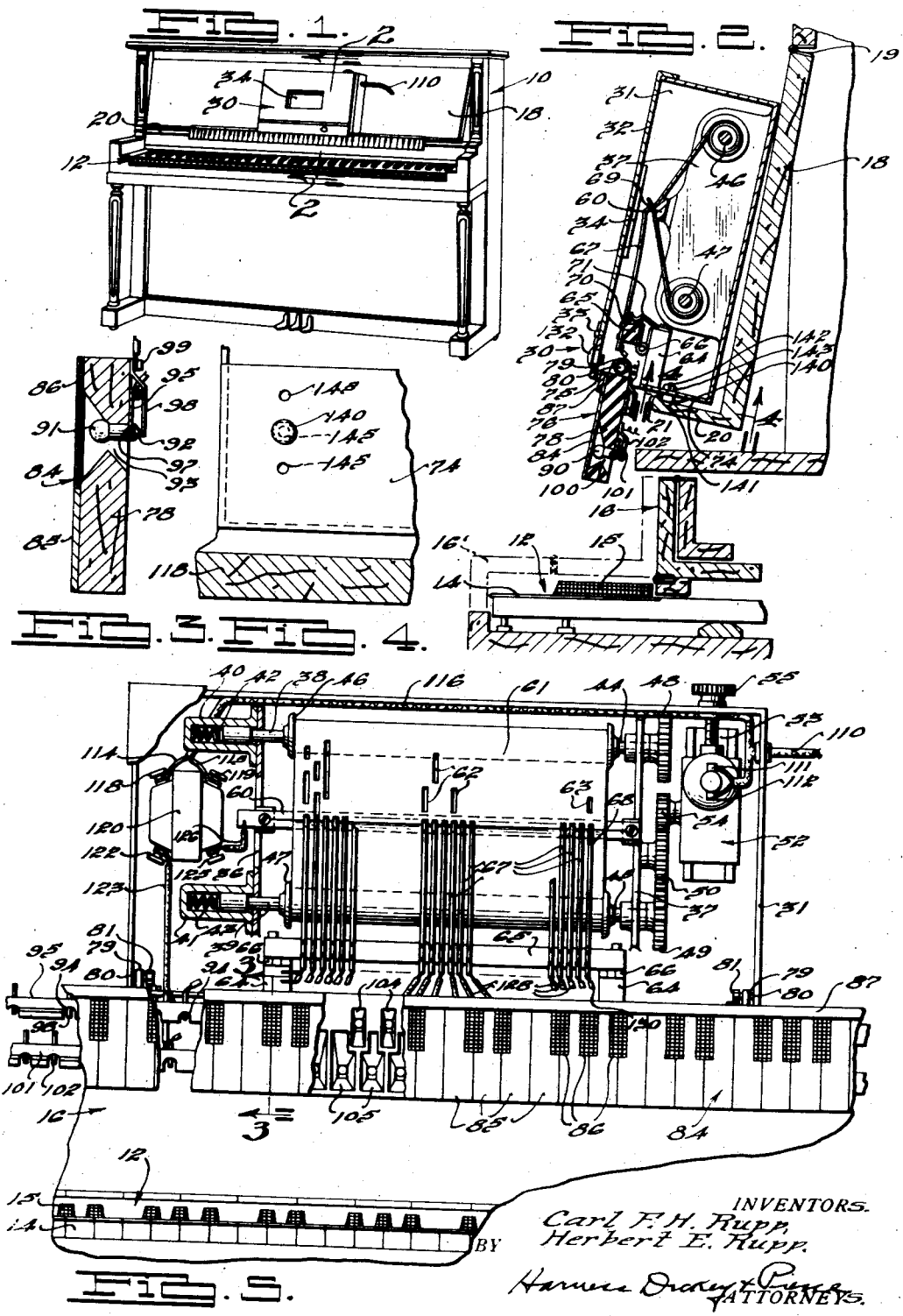
INVENTORS.
Carl F. H. Rupp,
Herbert E. Rupp.
BY
ATTORNEYS.

Nov. 26, 1940. C. F. H. RUPP ET AL 2,223,009
INSTRUCTION DEVICE FOR MUSICAL INSTRUMENTS
Filed July 24, 1937 3 Sheets-Sheet 2
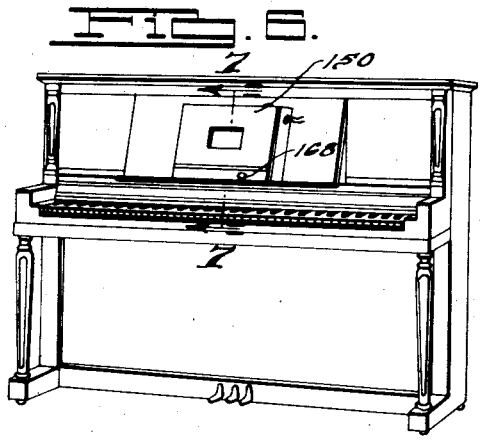
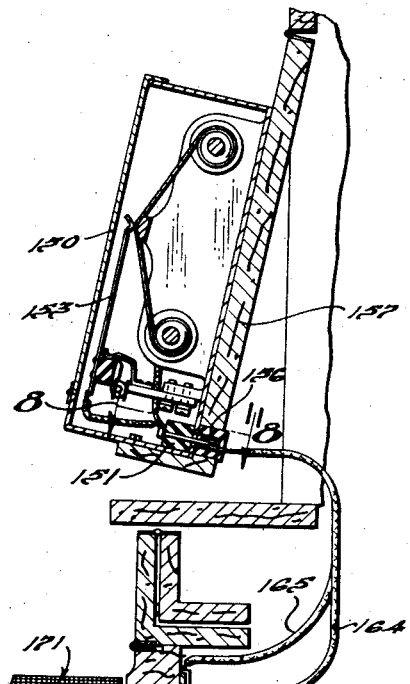
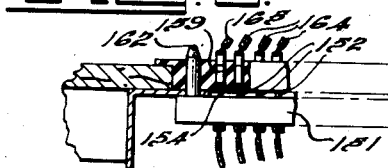
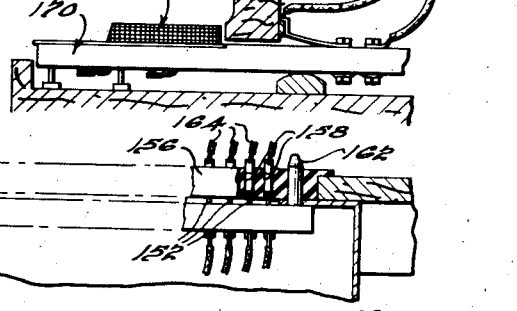
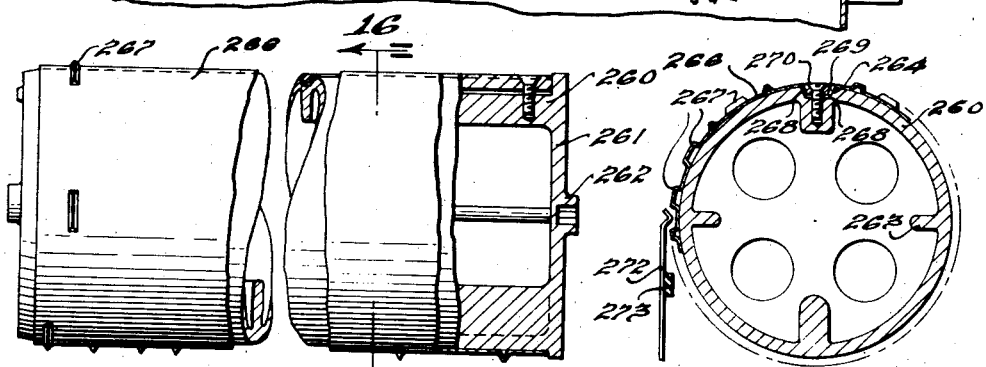
INVENTORS.
Carl F. H. Rupp,
Herbert E. Rupp.
BY
ATTORNEYS.

Nov. 26, 1940.   C. F. H. RUPP ET AL   2,223,009
INSTRUCTION DEVICE FOR MUSICAL INSTRUMENTS
Filed July 24, 1937   3 Sheets-Sheet 3
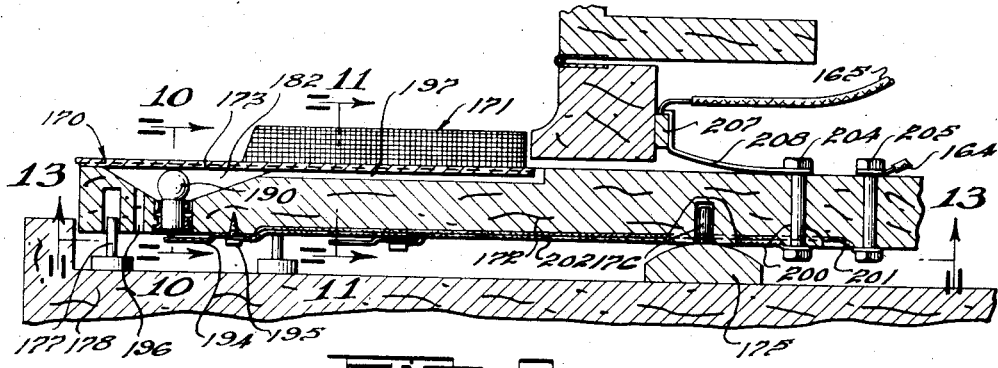
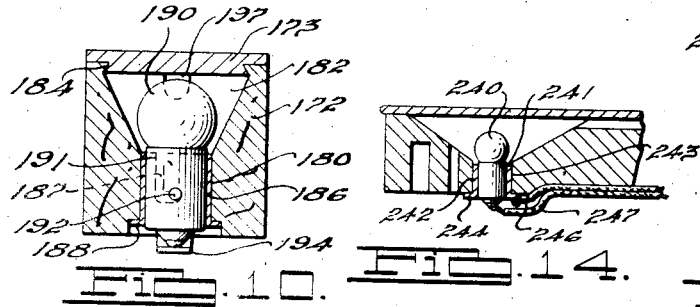
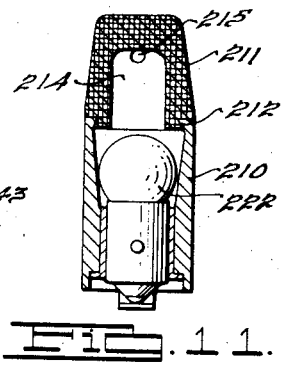
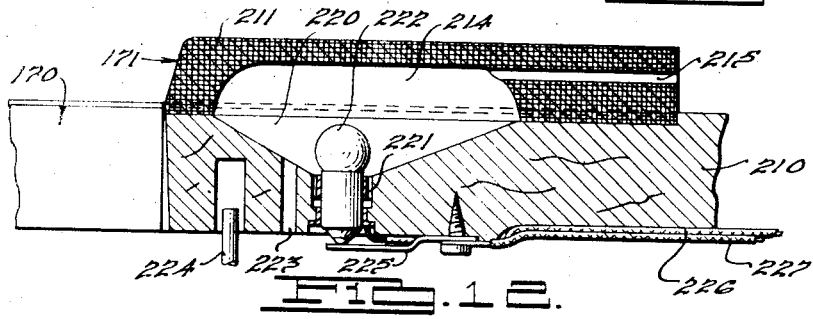
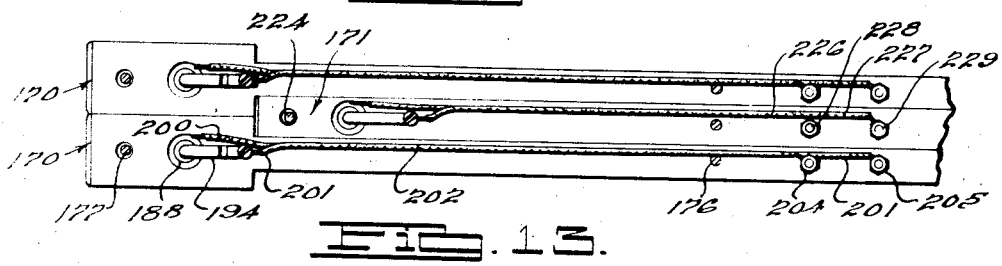
INVENTORS
Carl F. H. Rupp,
Herbert E. Rupp.
BY
ATTORNEYS.

Patented Nov. 26, 1940

2,223,009

UNITED STATES PATENT OFFICE 2,223,009

INSTRUCTION DEVICE FOR MUSICAL INSTRUMENTS

Carl F. H. Rupp, Birmingham, and Herbert E. Rupp, Detroit, Mich., assignors to Piano Master, Inc., Detroit, Mich., a corporation of Michigan Application July 24, 1937, Serial No. 155,362

4 Claims. (Cl. 84—478)

The present invention relates to an apparatus for use in instructing a novice to play a musical instrument, such as a piano.

It has been recognized that visual methods of instruction produce very rapid results and it is known that instruction in playing a musical instrument can be greatly expedited by the use of automatic means for visually signaling to the student what keys must be operated to play a musical composition. The present invention relates generally to the type of apparatus for this purpose shown in the patent to E. M. Schantz, No. 1,324,274, granted December 9, 1919, in which a note sheet of the type used in player pianos is utilized to control the operation of signal lights which are positioned in proximity to the keys of a piano or other musical instrument.

It is the general object of the present invention to provide an improved instruction device of the type mentioned which can be used to supplement the ordinary course of instruction. It is found that by the use of the present invention a novice can be taught to play a simple musical composition in a very short time. This arouses the interest of the pupil sufficiently to cause him to undertake the drudgery of the usual practice exercises and other instruction which are essential but show so little initial results.

None of the prior devices of the type mentioned have gone into extensive use principally because of the fact that they were cumbersome, intricate in construction, expensive to manufacture, and embodied an unsatisfactory type of signal unit.

Accordingly, it is a more specific object of the invention to provide a simple compact apparatus of the type mentioned which may be placed upon an ordinary piano without disfiguring the same and which may be removed at will when not required.

Another object of the invention is to incorporate both the control mechanism and the signaling device in a single unit of novel form and arrangement adapted to be placed upon a conventional piano when desired.

Another object of the invention is to provide an improved form of signaling device representing the keyboard of the piano in which the keys to be played are lighted up, thus impressing on the pupil's mind a visual picture of the actual keyboard as the signals are observed.

Another object of the invention resides in the provision of an improved signal device which is built into the usual keys of an ordinary piano without in any way disfiguring or changing the normal appearance of the keys.

Another object of the invention is to provide an improved removable control mechanism for a built-in signal system of the type just mentioned, and an improved and simplified means for connecting the control mechanism and the built-in signals.

Another object of the invention is to provide an improved and more compact control mechanism for an apparatus of the type mentioned.

Other objects and advantages, which include the provision of improved details of construction, will become apparent from the following specification and the accompanying drawings.

In the drawings:

Figure 1 is a perspective view of a conventional upright piano showing one form of the invention supported thereon;

Fig. 2 is a sectional view taken on the line 2—2 of Fig. 1;

Fig. 3 is a sectional view through a black key of the signal unit, taken on the line 3—3 of Fig. 5;

Fig. 4 is a fragmentary view of the bottom of the control unit casing, taken on the line 4—4 of Fig. 2;

Fig. 5 is a front elevation of the device mounted upon a piano with the cover removed and parts broken away to show the interior construction;

Fig. 6 is a perspective view of an upright piano in which is installed a modified form of the invention;

Fig. 7 is a section taken on the line 7—7 of Fig. 6;

Fig. 8 is a section taken on the line 8—8 of Fig. 7;

Fig. 9 is an enlarged longitudinal section through a white key;

Fig. 10 is a transverse section taken on the line 10—10 of Fig. 9;

Fig. 11 is a transverse section through a black key taken on the line 11—11 of Fig. 9;

Fig. 12 is a longitudinal section through a black key;

Fig. 13 is a bottom view showing the underside of two white keys and an intermediate black key;

Fig. 14 shows a modified method of installing the signal lamp in a key;

Fig. 15 is a fragmentary elevation view of a modified form of control device;

Fig. 16 is a section taken on the line 16—16 of Fig. 15.

Referring to Figs. 1 to 5, there is shown a control device and a signal device incorporated in a single unit and positioned upon a conventional upright piano. The piano is provided with the usual keyboard 12 comprising white keys 14 and black keys 15, an articulated cover 16 for the keyboard adapted to assume the closed position shown in dotted line in Fig. 2 at 16', and a front panel 18 hinged at 19 to the piano casing and provided with a ledge 20 having a lip 21 for retaining a music sheet in position to be read by the musician.

The combined control and signal unit which is indicated generally at 30 is formed of a casing 31 which may be either of sheet metal, as shown, or wood. The casing is provided with a cover 32 hinged to the front face thereof at 33 and provided with a transparent window 34. Mounted within the casing is a music roll supporting a driving mechanism similar in character to that utilized in automatic player pianos. The window 34 provides a means by which the musician may observe the music sheet during operation.

As shown in the drawings, there is provided a pair of spaced parallel partition members 36 and 37 carried by the rear wall of the casing 31. Rotatably and slidably journaled in the partition member 36 are a pair of stub shafts 38 and 39, the outer ends of which project into the housings 40 and 41 respectively and engage coil springs 42 and 43 positioned within the housings. The springs 42 and 43 normally urge the stub shafts 38 and 39 to the right as viewed in Fig. 5. A pair of shafts 44 and 45 are journaled intermediate their ends in the partition member 37 in alignment with the stub shafts 38 and 39 respectively. A music roll 46 of conventional construction is rotatably carried by the shafts 38 and 44, while a similar roll 47 is rotatably carried by shafts 39 and 45. The rolls are driven by spur gears 48 and 49 mounted respectively on the shafts 44 and 45. The gear 49 is constantly in mesh with an idler gear 50 carried by the partition 37. A unitary motor and speed reducing unit 52 is slidably mounted upon a dovetail slide 53 mounted on the rear wall of the casing and any suitable means such as an adjusting screw 55 is provided for slidably adjusting the motor unit in a vertical direction. The motor unit 52 carries a driving gear 54 which, upon adjustment of the unit upon the dovetail 53 may be shifted into engagement either with the gear 48 or with the idler gear 50, depending upon the direction in which it is desired to drive the music sheet.

A metallic tracker bar 60 is mounted upon the forward edges of the partition members 36 and 37 and extends across the space between the members in position to be engaged by a perforated music sheet 61 in the usual manner. The music sheet is provided with note perforations 62 located in a plurality of transversely spaced rows, each row representing one of the keys of the piano. There may be as many rows of note perforations on the music sheet as there are keys on the piano, but preferably only fifty-six rows of note perforations are utilized in accordance with the present invention in view of the fact that a novice is not ordinarily called upon to play over the entire keyboard. In addition to the note perforations, there is provided a row of pedal perforations 63 which indicate when the sustaining pedal of the piano should be operated. As best shown in Figs. 2 and 3, there are provided a pair of blocks 64 within the casing upon which a bar 65 of insulating material is pivotally mounted by means of hinges 66. Carried by the bar 65 are a plurality of spring bronze contact fingers 67, one for each row of note perforations in the music sheet, and a similar contact finger 68 for the row of pedal perforations. These contact fingers extend in the direction of movement of the music sheet and are provided with terminal portions 69 adapted to engage and make electrical contact with the tracker bar 60 when a perforation passes over the bar. There is provided a recess 70 in the upper edge of bar 65 and a spring latch 71 secured to one of the blocks 64 and engaged in the recess 70 for normally holding the contact fingers 67 and 68 in engagement with the tracker bar. It is apparent, however, that when access to the music sheet is required, the bar 65 and fingers 67 and 68 may be swung outwardly of the casing about hinge 66.

The bottom 74 of the casing 31 is provided with a longitudinally extending opening 75 through which projects the upper edge of a signaling device indicated generally at 76. The signaling device is formed of a board 78 having a pair of apertured ears journaled upon pins 80 carried by the casing. Nuts 81 are provided for tightening the ears and therefore the signaling device against pivotal movement with respect to the casing. The front surface of board 78 is covered by a sheet 84 of translucent material upon which is depicted a representation of the white and black keys of a piano at 85 and 86 respectively. Preferably, the material of sheet 84 is one of the molded cellulosic materials of which many types are available. One type which has been found very satisfactory is available under the trade name "Catalin." The black and white keys of the piano are preferably represented by including in the body of the material white and black coloring matter properly arranged to represent the white and black keys. Sheet 84 is translucent, that is, light may shine through it, but it is not transparent. The keys are preferably shown of full width, although they may be of somewhat abbreviated length. Accordingly, the front face of the signal unit has the appearance of a conventional piano keyboard except that the white and black keys lie in the same plane. Preferably, a molding strip 87 extends along the upper edge of sheet 84 in order to give the unit a finished appearance.

A lamp bulb 90 is positioned behind each white key represented upon the sheet 84, while a similar lamp bulb 91 is positioned behind each black key represented upon the sheet. As shown best in Figs. 3 and 5, the lamp bulbs 91, which are provided with conventional stub pins 92 adapted to cooperate with a bayonet slot type of socket, are mounted in openings 93 in board 78 and fit within U-shaped recesses 94 cut in the lower edge of a bar or strip 95 which is secured to the underside of the board 78. The bar 95 is provided with V notches 97 at opposite sides of the U-shaped recesses for the reception of the pins 92. The bulbs are held against displacement from the bar 95 by means of individual spring contact elements 98, one for each bulb, which elements are secured to the board 78 by means of screws 99, and have a hole or depression for receiving the pointed shank of the bulb. The openings 93 in board 78 flare outwardly at the bottom at the side opposite that on which contact 98 is secured in order that the bulb 91 may be withdrawn rearwardly from the opening. This is accomplished by disengaging the point of the bulb shank from contact 98, swinging it downwardly and withdrawing the bulb.

As shown best in Figs. 2 and 5, the lamp bulbs 90 for the white keys are similarly mounted in openings 100 in the board 78 and extend through U-shaped recesses in a bar or strip 101. Individual spring contact elements 102 are secured to the board 78 for holding the lamp bulbs 90 in position.

The lamp-receiving openings 93 and 101 flare outwardly at 104 and 105 respectively to the front face of the board 78 to a maximum size substantially equal to the size and shape of the keys represented on sheet 84, as best shown in Figs. 2, 3 and 5, in order that the lighted area of the underside of each key will correspond substantially to the full width of the key and to a major portion of its length. If desired, the entire length of the key may be lighted, but preferably the lighted area does not extend to the extreme rear end of the key as it is sufficient if the entire striking area of the key is illuminated.

The electrical connections for the apparatus will now be described:

A conventional electric cord 110 containing two separate wires which may be connected to any suitable source of electrical energy such as a 110-volt, 60-cycle alternating house current, extends into the casing 31 and the wires thereof are connected to the terminals 111 and 112 of the motor unit. In addition, the two wires of the cord 110 are connected to a pair of wires 114 and 115 which are enclosed in a cable 116 and connect with the high voltage terminals 118 and 119 of a transformer 120. One of the low voltage terminal 122 of the transformer is connected by a wire 123 with both of the lamp-supporting bars or strips 95 and 101, the strips being formed of brass or other electrical conductive material. This completes the circuit to one terminal of each of the lamp bulbs 90 and 91 since the strips 95 and 101 are in electrical contact with the shank of the bulb which in turn is connected to one end of the bulb filament.

The other low voltage terminal 125 of the transformer 120 is connected by a wire 126 to the tracker bar 160. Accordingly, when a perforation in music sheet 61 passes over the tracker bar, the corresponding spring finger 67 makes electrical contact with the tracker bar 60. Each finger 67 is connected by a wire 128 to one of the spring contact elements 98 or 102 to complete the circuit to the opposite terminals of the lamp bulbs.

The spring finger 68 is connected by a wire 130 to one terminal of a lamp 132 mounted in the front of casing 31, and the other terminal of this lamp is connected in any desired manner to terminal 122 of the transformer to complete the circuit.

It is apparent from the above that as the music sheet passes over the tracker bar 60, the passage of note perforations closes the circuits of the lamp bulbs mounted beneath the corresponding key represented upon sheet 84 of the signal device. Moreover, the lamp circuit remains closed as long as the corresponding perforation continues to pass over the tracker bar, thus indicating the length of time which the key should be depressed. It is contemplated that the music sheet will be provided with perforations corresponding in position to the fundamental notes and cords of a musical composition, with the result that when the music sheet is operated the proper keys on the signal unit are illuminated in the desired order and in the proper combinations, thus indicating to the pupil what notes to operate upon the piano keyboard. Any desired means, not shown, are provided for controlling the speed of passage of the music sheet over the tracker bar with the result that the pupil can at first operate the music sheet at an exceedingly low speed and gradually increase the speed as he masters the composition. During passage of the music sheet over the tracker bar, pedal perforations will illuminate the pedal lamp which is positioned immediately in front of the pupil, thus indicating when the sustaining pedal of the piano should be depressed.

It is essential that the signal device be properly positioned with respect to the corresponding keys of the actual keyboard in order to produce the best results. It is a relatively simple matter to adjust the entire unit longitudinally of the piano until the keyboard of the signal unit and the keyboard of the actual piano coincide. However, different makes and styles of pianos differ in their proportions with the result that it is necessary to provide means by which the signal unit can be adjusted vertically and towards and away from the musician in order that it will not interfere with the operation of the actual keyboard on one hand or with the body of the piano on the other. Accordingly, the casing 31 is provided with a pair of legs 140 having soft rubber end portions 141 adapted to engage immediately behind the lip 121 of the music sheet ledge 120 of a piano. The upper end of the leg 140 projects through a suitable opening in the bottom wall 74 of the casing and is secured in position by means of a nut 143. It is apparent that the legs 140 may be removed and replaced by legs of any desired length in order to properly position the unit vertically with respect to the actual keyboard of the piano. In addition, there are provided a plurality of openings 145 in the bottom wall 74 of the casing through which the upper end 142 of the leg may be inserted in order to adjust the unit fore and aft of the piano to the desired point. Accordingly, it is a relatively simple matter to provide appropriate legs for adapting the unit to pianos of any style or make. In addition, the signal unit may be swung through a limited angle about its pivotal connection with the casing, if desired or necessary.

It is apparent, in view of the above, that there is provided, in accordance with this form of invention, an exceedingly compact, relatively simple, combined control and signal unit for guiding a novice in the playing of a piano. To assist the novice, there may be printed upon the music sheet, in addition to the note perforations, other information such as the words of the song, the names of the notes, or any other instructions which might assist the mastering of the composition. One of the principal advantages of this form of the invention resides in the character of the signal unit and its position relative to the keyboard. Since the signal unit is a substantial replica of the actual keyboard of the instrument, it is apparent that in observing the signal unit the pupil will necessarily form a visual picture of the actual keyboard which is being played. This not only constitutes an effective means for indicating what notes should be played on the actual keyboard, but it impresses upon the pupil's mind the keyboard itself and its relation to the notes which must be played for a given composition. Accordingly, it is found that the pupil, after following the signal unit for a relatively short period, can remove the unit and play directly from the actual keyboard by memory, having formed a mental picture of the keys which must be played in the proper sequence.

In Figs. 6 to 13 inclusive, there is shown a modified form of the invention wherein the signal unit is permanently embodied in the actual keyboard of the piano and the control unit is removable from the piano independently of the signal unit. In this form of the invention the control unit which is indicated generally at 150 is substantially identical with the control unit previously described except that it is not provided with supporting legs. The only other difference resides in the fact that in this form of the invention there is provided within the control unit casing an elongated block 151 of insulating material within which are mounted a plurality of contact pins 152 which are electrically connected to the spring fingers 153 for the music perforations. The block 151 carries an additional contact pin 154 which is electrically connected with the opposite terminal of the transformer from that to which the tracker bar is connected. Mounted within the front panel member 157 is a cooperating multiple socket unit 156 having a plurality of sockets 158 adapted to receive and make electrical contact with pins 152. The socket member 156 also contains a socket 159 adapted to receive the contact pin 154. A pair of locating pins 162 are rigidly secured to the block 151 and are adapted to extend through suitable openings in the socket member 156 for properly positioning the block with respect to the socket member when the two are assembled. It is apparent that the block 151 is removable from the piano with the control device 150 and that the electrical circuits from the control device to the signal device are completed by simply positioning the control unit on the piano in the manner shown in Figs. 6, 7 and 8. Sockets 158 are connected to a plurality of wires 164, one for each socket, and socket 169 is similarly connected to a wire 165, the wires 164 and 165 extending into the casing of the piano as shown best in Fig. 7. A pedal lamp 168 is mounted in the casing of the control unit and is connected in the manner described in connection with the previous modification of the invention.

The manner in which the signal lamps are mounted within the actual keys of the piano is best shown in Figs. 9 to 13. As best shown in Figs. 9, 10 and 13, the white key 170 is formed of a wooden base portion 172 which is provided with a translucent top or finish layer 173. The top layer 173 is preferably formed of a molded cellulosic material such as "Catalin" and is colored to simulate ivory. The key 170 rocks upon a supporting bar 175 which is provided with an upstanding pin 176 that projects into a suitable opening in the key in a conventional manner. In addition, there is provided the usual guide pin 177 carried by the key bed 178 and projecting into an opening in the forward end of the key. In accordance with this form of the invention, the key is provided with a countersunk bore 180 which is flared outwardly at its upper end to almost the full width of the key and to a substantial portion of the length of the key. The top layer 173 is removably secured to the base portion 172 by means of a dovetail groove connection 184 which permits removal of the top layer by sliding the same outwardly with respect to the key in order to provide access to the signal lamp for replacement thereof.

A sleeve 186 having a bayonet slot 187 and a flange 188 is press fitted into the bore 180 as shown best in Fig. 10 and a bulb 190 having a shank 191 is inserted into the sleeve. The conventional stub pins 192 on the shank of the bulb engage on the bayonet slot 187 to retain the bulb against displacement. To assist in retaining the bulb and to complete the electrical circuit thereto, there is provided a spring contact element 194 which engages the lower end of the shank 191 and which is secured in the underside of the key by means of a screw 195. In order to prevent heating of the keys by reason of the signal lamps, there may be provided a pair of ventilation ducts 196 and 197, as best shown in Fig. 9, which permit a circulation of air through the space within which the lamp bulb is located.

A wire 200 is brazed or otherwise permanently secured to the sleeve flange 188 and a wire 201 is secured in electrical contact with the contact element 194 by means of screw 195. The bottom surface of the key is provided with a groove 202 extending rearwardly therein and adapted to receive the wires 200 and 201. The wires 200 and 201 extend rearwardly in groove 202 beyond the support 175 and are connected to a pair of terminal bolts 204 and 205 respectively. A strip or bar 207 of brass or the like is secured to the interior of the piano casing adjacent the inner ends of the keys and a contact spring 208 is electrically connected to the bar 207 and to the terminal bolt 204. The wire 165 previously described is electrically connected to the bar 207 and one of the wires 164 is secured to the terminal bolt 205. It will be understood that there is a separate spring contact element 208 for each key of the piano and a separate wire 164 for each key. However, all of the spring contact elements 208 are electrically connected to the bar 207. Accordingly, the electrical circuit is completed through wire 165, bar 207, spring 208, terminal 204 and wire 200 to the lamp, thence through wire 201, terminal bolt 205, and wire 164.

It is apparent that the bulbs may be removed from the white keys by merely sliding the top cover layer 173 off the ends of the keys, whereupon the bulb may be grasped, twisted to release it from the bayonet slot and then merely lifted out of the socket. There is thus provided an exceedingly effective arrangement by means of which burned out signal lamp bulbs may be replaced.

The arrangement of the signal lamps in the black keys is shown best in Figs. 11, 12 and 13. As there shown, the black keys are formed of a wooden base portion 210 and a translucent top portion 211 which are dovetailed together at 212 with the result that the translucent top portion of the key may be removed. The translucent top portion of the black keys is recessed at 214 to provide a thinner wall section for transmission of light and a ventilation opening 215 is provided in the translucent top portion adjacent the upper part of the recess 214.

In the black keys the signal lamps are mounted in substantially the same way in which they are mounted in the white keys. Thus the base portion of the key is provided with an outwardly flared opening 220 communicating with a socket formed by a sleeve 221 having a conventional bayonet slot therein. The bulb 222 is mounted in the sleeve in the manner previously described. The ventilation opening 223 is provided adjacent the bulb and a guide pin 224 supported by the key bed of the piano projects into a suitable opening in the key forwardly of the lamp. A spring contact element 225 is secured to the underside of the key and contacts the point on the top of the lamp. Wires 226 and 227 are connected respectively to the flange of the sleeve 221 and to the contact element 225 and are in turn connected respectively to terminal bolts 228 and 229 similar to the terminal bolts 204 and 205 described in connection with the white keys. The terminal bolt 228 is connected by a spring 208, not shown, to the bar 207 and the terminal bolt 229 is connected by a wire 164 to the multiple socket.

It is apparent from the above that there is provided in accordance with this form of the invention a piano keyboard which to all outward appearances is no different from the keyboard of the conventional piano but which, nevertheless, contains signal lamps mounted within each key and so arranged that substantially the entire striking surface of the key will be illuminated when the lamp is lit. Moreover, there is provided a signal lamp within each key so arranged that it may be readily removed or replaced by a new lamp without the necessity of removing the keys or getting access to the interior of the piano. The dovetail connection between the translucent top portions of the keys and the wooden base portions thereof has sufficient friction to prevent accidental removal or loosening of the top surfaces without interfering seriously with the removal thereof when desired.

The provision of signal lamps mounted within the actual keys of the piano constitutes an extremely effective signal device inasmuch as the pupil can keep his eyes upon the keyboard at all times and simply strike the keys which are illuminated.

In Fig. 14 is shown a modified method of mounting the signal lamp bulb within the key of a piano. In this modification the key construction is similar to the keys shown in Figs. 9 to 13 except that the translucent top portions are permanently secured in position and the bulb is so mounted that it must be withdrawn from the bottom of the key.

Referring to Fig. 14 there is shown a bulb 240 having a shank 241 which is permanently secured within a sleeve 242 by brazing or otherwise. The sleeve 242 is then press fitted into a bore 243 formed in the base portion of the key until a flange 244 on the end of the sleeve abuts against the undersurface of the key. In this form of the invention the lead wires 246 and 247 are permanently secured to the flange 244 and to the tip on the shank 241 of the bulb respectively by brazing or otherwise and their inner ends are connected to terminals carried by the key similar to the terminals 204 and 205 shown in Fig. 9. The remainder of the key construction is similar to that shown in Figs. 9 to 13.

It is apparent that in the form of the invention shown in Fig. 14 the bulb with its attached sleeve and lead wires may be removed as a unit from the key by simply pulling it outwardly through the bottom of bore 243. The sleeve 244 is of slightly larger diameter than the bulb 240 with the result that the bulb itself will pass freely through the bore. The flange 244 on the sleeve assists in locating the bulb and provides a means by which the bulb may be removed. This being accomplished by inserting a screw driver or other sharp edged instrument beneath the flange. It is apparent that if the piano is otherwise of conventional construction it will be necessary to remove the keys from the piano before the bulbs may be removed. If desired, however, suitable openings may be provided within the key bed through which access may be had to the underside of the key for removal of the bulbs and lead wires without the necessity of removing the keys from the piano.

In Figs. 15 to 16 is shown a modified form of roll mechanism for controlling the illumination of the signal keys. In this form of roll mechanism only a single roll 260 is provided, this roll being preferably formed of lightweight cast metal such as aluminum. The roll is provided with end walls 261 having apertured bosses 262 for rotatably supporting the roll. Internal stiffening ribs are preferably provided. The outer surface of the roll is provided with a longitudinally extending slot 264 shown best in Fig. 16 for a purpose to be described.

In this form of control mechanism a metallic music sheet 266 having pressed out note projections 267 is wrapped entirely around the roll and secured in position thereon by means of offset end portions 268 on the sheet which extend into the slot 264 of the roll. The offset end portions 268 are secured in the slot by means of a retaining bar 269 which may be held in position in any suitable way such as by a screw 270. In this form of the invention the contact fingers 272 are arranged similarly to the contact fingers 67 or 153 previously described except that they are held out of contact with the smooth portions of the music sheet by means of a bar 273 of insulating material. The ends of the fingers 272, however, may be engaged by the note projections to complete a circuit through the roll, the note sheet and the contact fingers.

One of the advantages of the form of control mechanism just described resides in the fact that it is substantially more compact than the double roll mechanism shown in prior modifications and lends itself to a simpler and less expensive construction. The roll may be driven in any suitable manner by an electric motor and the usual reversing means may be omitted if desired in view of the fact that it is unnecessary to rewind the sheet as in the previous constructions. The form of roll shown in Figs. 15 and 16 is preferably made of substantially larger diameter than the conventional music sheet rolls and is driven at a slower speed in order to compensate for the difference in lengths of the music sheet. This means that the note projections are positioned closer together upon the sheet 266 than corresponding note perforations on a conventional music sheet. The roll 260 is, of course, electrically connected in the circuit at the same point at which the tracker bar is connected in previous modifications.

It is apparent that there is provided in accordance with the present invention an exceedingly simple and effective arrangement for guiding a novice in the playing of a piano. The signaling devices provided in accordance with this application are peculiarly adapted to properly guide the pupil and to facilitate memorizing a musical composition in view of the fact that the signals impress upon the pupil a visual picture of the keyboard of the piano. The devices shown may be installed upon a conventional piano at will but when removed the piano has the same appearance as any conventional piano.

While several modifications of the invention are shown and described, it is apparent that other variations in the arrangement may be resorted to without departing from the spirit of the invention or the scope of the appended claims.

What is claimed is:

1. An instruction device for a piano comprising a member upon which is depicted a representation of a piano keyboard of a length equal to the length of an actual keyboard of the same number of keys that are depicted upon said member, means for mounting said member upon a piano with the represented keys above, rearwardly of and in alignment with the corresponding keys of the piano and in position to be observed by the player, and means for illuminating the represented keys in the combinations and sequences necessary to guide in the playing of a musical composition.

2. An instruction device for a piano comprising a supporting member, a sheet of translucent material covering one face of said member, said translucent material having light and dark portions representing the keys of a piano keyboard, said keys being of the same width and arrangement as on an actual piano keyboard, said supporting member being provided with a separate recess behind each key represented on said sheet of translucent material, a lamp in each recess, means for removably mounting said device upon a piano with the represented keys above and in alignment with the actual piano keys, and means for illuminating said lamps in proper sequence to guide in the playing of a musical composition.

3. An instruction device for a piano comprising a casing, legs on said casing adapted to engage behind the lip of a piano music sheet rack when the casing rests against the back of said rack, a signal device carried by said casing and depending therefrom, said signal device comprising an elongated member extending parallel to the piano keyboard above and rearwardly of the same, said signal device having represented thereon a piano keyboard with the keys thereof in alignment with the corresponding keys of the piano, lamps for illuminating the respective keys represented on said signal device, and means in said casing for controlling the illumination of said lamps in proper sequence to guide in playing the piano.

4. An instruction device for a piano comprising a casing, legs on said casing adapted to engage behind the lip of a piano music sheet rack when the casing rests against the back of said rack, a signal device carried by said casing and depending therefrom, said signal device comprising an elongated member extending parallel to the piano keyboard above and rearwardly of the same, said signal device having represented thereon a piano keyboard with the keys thereof in alignment with the corresponding keys of the piano, lamps for illuminating the respective keys represented on said signal device, and means in said casing for controlling the illumination of said lamps in proper sequence to guide in playing the piano, said legs on the casing being removable whereby legs of varying lengths may be provided and said casing being provided with a plurality of attaching locations for said legs spaced fore and aft of the casing whereby the height and inclination of the casing may be adjusted.

CARL F. H. RUPP.
HERBERT E. RUPP.